US008675742B2

(12) United States Patent
Zhang (10) Patent No.: US 8,675,742 B2
(45) Date of Patent: Mar. 18, 2014

(54) METHOD AND SYSTEM FOR SYNCHRONOUSLY TRANSMITTING ASYNCHRONOUS DATA (75) Inventor: Qiang Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/637,456

(22) PCT Filed: Nov. 2, 2010

(86) PCT No.: PCT/CN2010/078330
§ 371 (c)(1),
(2), (4) Date: Sep. 26, 2012

(87) PCT Pub. No.: WO2011/134251
PCT Pub. Date: Nov. 3, 2011

(65) Prior Publication Data
US 2013/0070865 A1    Mar. 21, 2013

(30) Foreign Application Priority Data

Apr. 30, 2010  (CN) .......................... 2010 1 0165369

(51) Int. Cl.
H04L 27/00  (2006.01)

(52) U.S. Cl.
USPC ............ 375/259; 375/219; 375/295; 375/354

(58) Field of Classification Search
USPC .................................. 375/259, 219, 295, 354
See application file for complete search history.

(56) References Cited

U.S. PATENT DOCUMENTS

| 6,920,185 B2* | 7/2005 | Hinson .......................... 375/295 |
| 2003/0086515 A1* | 5/2003 | Trans et al. .................... 375/346 |
| 2005/0186933 A1* | 8/2005 | Trans ............................ 455/296 |

FOREIGN PATENT DOCUMENTS

| CN | 1188359 A | 7/1998 |
| CN | 1761235 A | 4/2006 |
| CN | 201118605 Y | 9/2008 |
| CN | 101820324 PX | 9/2010 |

OTHER PUBLICATIONS

International Search Report dated Feb. 17, 2011 for PCT/CN2010/078330.

* cited by examiner

Primary Examiner — Ted Wang
(74) Attorney, Agent, or Firm — Banner & Witcoff, Ltd.

(57) ABSTRACT

A transmission method for synchronously transmitting asynchronous data is disclosed by the present invention, and the method includes: a transmitting end encapsulating the asynchronous data into a synchronous data frame, and synchronously transmitting it to a receiving end; and the receiving end receiving and de-encapsulating the synchronous data, writing the obtained asynchronous data into a buffer of the receiving end, reading the asynchronous data by using a reading clock of the asynchronous data and outputting the asynchronous data to a receiving apparatus for asynchronous data; wherein, the receiving end also adjusts the frequency of reading clock by using data depth information of the buffer, increases the frequency of reading clock when the data depth in the buffer increases, and outputs data representing idle when the buffer is empty. A transmission system and receiving apparatus for synchronously transmitting asynchronous data are also disclosed by the present invention.

16 Claims, 4 Drawing Sheets

METHOD AND SYSTEM FOR SYNCHRONOUSLY TRANSMITTING ASYNCHRONOUS DATA

TECHNICAL FIELD

The present invention relates to the field of communication transmission networks, and in particular, to a method for converting asynchronous data into synchronous data for transmission.

BACKGROUND OF THE RELATED ART

Transmission of asynchronous data in a synchronous channel is that the asynchronous data is converted into synchronous data for transmission in a quasi-synchronous channel, and the data in the quasi-synchronous channel is received without damage, and the data is then restored to the asynchronous data. In general, the transmission of the asynchronous data in the synchronous channel has low requirements on the clock, and since there is idle data between asynchronous data packages, which can offset the deviation between the clock frequencies of baud rate generators of the transmitting end and the receiving end, i.e. both the transmitting end and the receiving end can obtain the same baud rate as that of the asynchronous data by using the frequency division of the local oscillator to sample the asynchronous data. However, if the asynchronous data is transmitted continuously for a long time, i.e. there is no idle between data, for example, a Personal Computer (PC) uses a serial port to continuously transmit a large number of pictures or documents and so on, there will generate clock sliding on the channel over time, which results in error of code elements in the transmission. Although increasing the buffer of the receiving end can enhance the anti-slip property, it is also very easy to result in completely writing and reading the buffer over time. A Chinese Patent CN200720102430.X provides a method for inserting or deleting empty blocks to implement synchronous transmission of asynchronous data; however, such method is very complex, and requires that the transmitted and received clocks of the baud rate generators are completely synchronous.

SUMMARY OF THE INVENTION

The technical problem to be solved by the present invention is to provide a method for synchronously transmitting asynchronous data, which solves the problem of slip code during synchronous transmission of asynchronous data, and the present method is simpler.

In order to solve the above problem, the present invention provides a transmission method for synchronously transmitting asynchronous data, comprising:

a transmitting end encapsulating the asynchronous data into a synchronous data frame, and synchronously transmitting it to a receiving end; and the receiving end receiving and de-encapsulating the synchronous data, writing the obtained asynchronous data into a buffer of the receiving end, reading the asynchronous data by using a reading clock of the asynchronous data and outputting the asynchronous data to a receiving apparatus for the asynchronous data; wherein, the receiving end also adjusts frequency of the reading clock by using data depth information of the buffer, increases the frequency of the reading clock when the data depth in the buffer increases, and outputs data representing idle when the buffer is empty.

The method further comprises:

when the buffer of the receiving end is changed from empty to non-empty, the receiving end performing frequency division on a local high-speed clock, wherein, the generated frequency of the reading clock is the same as a baud rate of the asynchronous data or is equal to a value which is obtained through a baud rate of asynchronous clock module divided by the number of bits occupied by one asynchronous data package.

The data depth of the buffer of the receiving end is set as k thresholds, and for each threshold $f(i)$ of the data depth, an adjustment value corresponding to the frequency of the reading clock and a maximum value of the adjustment value are set, wherein, k is a positive integer, $f(i)$ is a positive integer and $f(i)<f(i+1)$, and i is a positive integer and $i\in[1, k]$;

the receiving end detects the data depth of the buffer in real time, and when the data depth increases and exceeds the threshold $f(i)$, the frequency of current reading clock is increased by using the adjustment value corresponding to the threshold $f(i)$; and when the data in the buffer of the receiving end is read completely, the reading clock is also stopped.

The receiving end adjusting the frequency of the reading clock by using data depth information of the buffer comprises adjusting the frequency according to a rational number frequency division method, and when the data depth in the buffer increases, the frequency of the reading clock is increased by reducing a rational number frequency dividing ratio.

A buffer with the data depth of the receiving end being Y is divided into k segments, wherein, $Y>k$ and both Y and k are positive integers;

when the buffer of the receiving end is changed from empty to non-empty, a rational number frequency dividing ratio of the reading clock generated by the receiving end through using the local high-speed clock is $m/n$, wherein, both nominal values m and n are positive integers;

when the buffer of the receiving end is non-empty, the receiving end detects the data depth of the buffer in real time, and when the data depth increases and exceeds $j\times Y/k$, m is adjusted as $(m-(2^j \times T))_{round\ down}$, wherein, j represents a segment value of the current data depth, j is a positive integer and $j<=k$, T is an adjusted stepping rate, $T>0$ and $(\Sigma_{i=1}^{k} 2^i \times T) \leq (t\times m)$, wherein, t is a maximum amplitude for the adjustment of original nominal value m which is determined according to the rational number frequency division method, $0<t<1$, and the value of T is adjustable; and if the buffer overflows according to a value of T which is set originally, the value of T is increased.

In order to solve the above problem, the present invention further provides a transmission system for synchronously transmitting asynchronous data, comprising a transmitting end and a receiving end, wherein, the transmitting end is configured to encapsulate the asynchronous data into a synchronous data frame, and synchronously transmit it to a receiving end; and the receiving end is configured to receive and de-encapsulate the synchronous data, write the obtained asynchronous data into a buffer of the receiving end, read the asynchronous data by using a reading clock of the asynchronous data and output the asynchronous data to a receiving apparatus for the asynchronous data;

the receiving end comprises a start bit detection module, a buffer maintenance module and an adjustable asynchronous clock module, wherein, the start bit detection module is configured to receive and de-encapsulate the synchronous data, and transmit the obtained asynchronous data to the buffer maintenance module;

the buffer maintenance module is configured to write the asynchronous data into a buffer, detect a data depth of the buffer and provide the data depth to the adjustable asynchronous clock module, use the reading clock provided by the adjustable asynchronous clock module to read the asynchronous data in the buffer, output the asynchronous data to the receiving apparatus for the asynchronous data, and output data representing idle when detecting that the buffer is empty; and the adjustable asynchronous clock module is configured to provide the reading clock of the asynchronous data, and use data depth information of the buffer to adjust a frequency of the reading clock, and increase the frequency of the reading clock when the data depth in the buffer increases.

In order to solve the above problem, the present invention further provides a receiving apparatus for synchronously transmitting asynchronous data, comprising a start bit detection module, a buffer maintenance module and an adjustable asynchronous clock module, wherein, the start bit detection module is configured to receive synchronous data which is synchronously transmitted to a receiving end by a transmitting end after encapsulating the asynchronous data into a synchronous data frame, de-encapsulate the received synchronous data, and transmit the obtained asynchronous data to the buffer maintenance module;

the buffer maintenance module is configured to write the asynchronous data into a buffer, detect a data depth of the buffer and provide the data depth to the adjustable asynchronous clock module, use the reading clock provided by the adjustable asynchronous clock module to read the asynchronous data in the buffer, output the asynchronous data to the receiving apparatus for the asynchronous data, and output data representing idle when detecting that the buffer is empty; and the adjustable asynchronous clock module is configured to provide the reading clock of the asynchronous data, and use data depth information of the buffer to adjust a frequency of the reading clock, and increase the frequency of the reading clock when the data depth in the buffer increases.

The adjustable asynchronous clock module comprises a frequency dividing ratio adjustment module and an asynchronous clock generation module, wherein, the frequency dividing ratio adjustment module is configured to: when detecting that the buffer is changed from empty to non-empty, determine a frequency dividing ratio of the reading clock of the asynchronous data, wherein, the frequency dividing ratio is a value obtained through a local high-speed clock divided by a baud rate of the asynchronous data, or a value obtained through the local high-speed clock multiplied by the number of bits occupied by one asynchronous data package and then divided by the baud rate of the asynchronous data; and transmit the frequency dividing ratio to the asynchronous clock generation module, use the data depth information of the buffer to determine the frequency dividing ratio of the reading clock and transmit the frequency dividing ratio to the asynchronous clock generation module, and when detecting that the data depth in the buffer increases, reduce the frequency dividing ratio, and when detecting that the buffer is empty, notify the asynchronous clock generation module to stop the reading clock; and the asynchronous clock generation module is configured to generate the reading clock of the asynchronous data according to the frequency dividing ratio of the frequency dividing ratio adjustment module and provide the reading clock to the buffer maintenance module.

The frequency dividing ratio adjustment module is further configured to record k thresholds set for the data depth of the buffer, with each threshold $f(i)$ of the data depth and an adjustment value of a corresponding frequency dividing ratio, and the adjustment value being less than or equal to a set maximum value, wherein k is a positive integer, $f(i)$ is a positive integer and $f(i)<f(i+1)$, and i is a positive integer and $i \in [1, k]$; obtain the data depth information of the buffer periodically, and if detecting that the data depth increases and exceeds the threshold $f(i)$, reduce a current frequency dividing ratio by using the adjustment value corresponding to the threshold $f(i)$, and transmit the adjusted frequency dividing ratio to the asynchronous clock generation module.

The frequency dividing ratio adjustment module is further configured to adjust a frequency of the reading clock by using data depth information of the buffer, adjust the frequency according to a rational number frequency division method, and when detecting that the data depth in the buffer increases, reduce a nominal value of a rational number frequency dividing ratio.

The frequency dividing ratio adjustment module is further configured to record information that a buffer with the data depth being Y is set as k segments, wherein, $Y>k$ and both Y and k are positive integers;

when detecting that the buffer of the receiving end is changed from empty to non-empty, determine that the frequency dividing ratio is m/n, wherein, both nominal values m and n are positive integers;

when detecting that the buffer of the receiving end is non-empty, periodically obtain the data depth information of the buffer, and if the data depth increases and exceeds $j \times Y/k$, adjust m as $(m-(2^j \times T))_{round\ down}$, wherein, j represents a segment value of the current data depth, j is a positive integer and $j<=k$, T is an adjusted stepping rate, $T>0$ and $(\Sigma_{i=1}^{k} 2^i \times T) \leq (t \times m)$ t is a maximum amplitude for the adjustment of original nominal value m which is determined according to the rational number frequency division method, $0<t<1$, and the value of T is adjustable; and if detecting that the buffer overflows, increase the value of T.

The buffer maintenance module comprises a detection module, a storage module, and a data reading module, wherein, the detection module is configured to detect the data depth of the storage module in real time, and provide the data depth information to the frequency dividing ratio adjustment module;

the storage module comprises a buffer, and the storage module is configured to store the asynchronous data obtained through the start bit detection module performing de-encapsulation; and the data reading module is configured to read and output the data in the storage module by using the reading clock, and if detecting that the reading clock stops, output data representing idle.

The apparatus further comprises an input data conversion module, an output data conversion module and a timing module, wherein, the input data conversion module is located between the start bit detection module and the buffer maintenance module, and the output data conversion module is located at an output end of the buffer maintenance module, wherein, the input data conversion module is configured to receive data transmitted by the start bit detection module, convert the data into parallel data, and transmit the parallel data to the buffer maintenance module;

the output data conversion module is configured to receive the data transmitted by the buffer maintenance module, and convert the data into serial data for output;

the timing module is configured to receive a notification of the start bit detection module, start a timer, and when the timer expires, notify the start bit detection module, wherein a time length of the timer is equal to a time length for serial transmission of one asynchronous data package; and the start bit detection module is configured to detect a start bit of the asynchronous data in the synchronous data frame, and when the start bit of the asynchronous data is detected, notify the timing module and stop detection, and when the timer expires, resume the detection.

The present invention provides a simple and effective method for synchronously transmitting asynchronous data by using independent asynchronous clocks for the transmitting end and the receiving end, and adjusting the rational number frequency dividing ratio according to the condition, which is empty or full, of the buffer of the receiving end, i.e., increasing the frequency of the reading clock when the data depth in the buffer increases and the receiving end outputting data representing idle to the receiving apparatus for the asynchronous data when the buffer is empty to prevent the data in the buffer from overflowing or being completely read, which solves the problem of slip code during continuous synchronous transmission of the asynchronous data. The present invention adjusts the rational number frequency dividing ratio with different amplitudes for different values of the data depth of the buffer of the receiving end, and the more full the data in the buffer is, the greater the amplitude of the adjustment is, so that the frequency of the reading clock increases more, thereby effectively preventing the data in the buffer from overflowing, and the stepping rate for adjusting the rational number frequency dividing ratio in the present invention is adjustable, so that the adjustment of the frequency of the reading clock is more flexible, which further effectively prevents the data in the buffer from overflowing.

PREFERRED EMBODIMENTS OF THE PRESENT INVENTION

The embodiments of the present invention will be described in detail in conjunction with accompanying drawings hereinafter. It should be illustrated that the embodiments in the present application and the features in the embodiments can be combined randomly with each other without conflict.

Embodiment One

Figure 1:
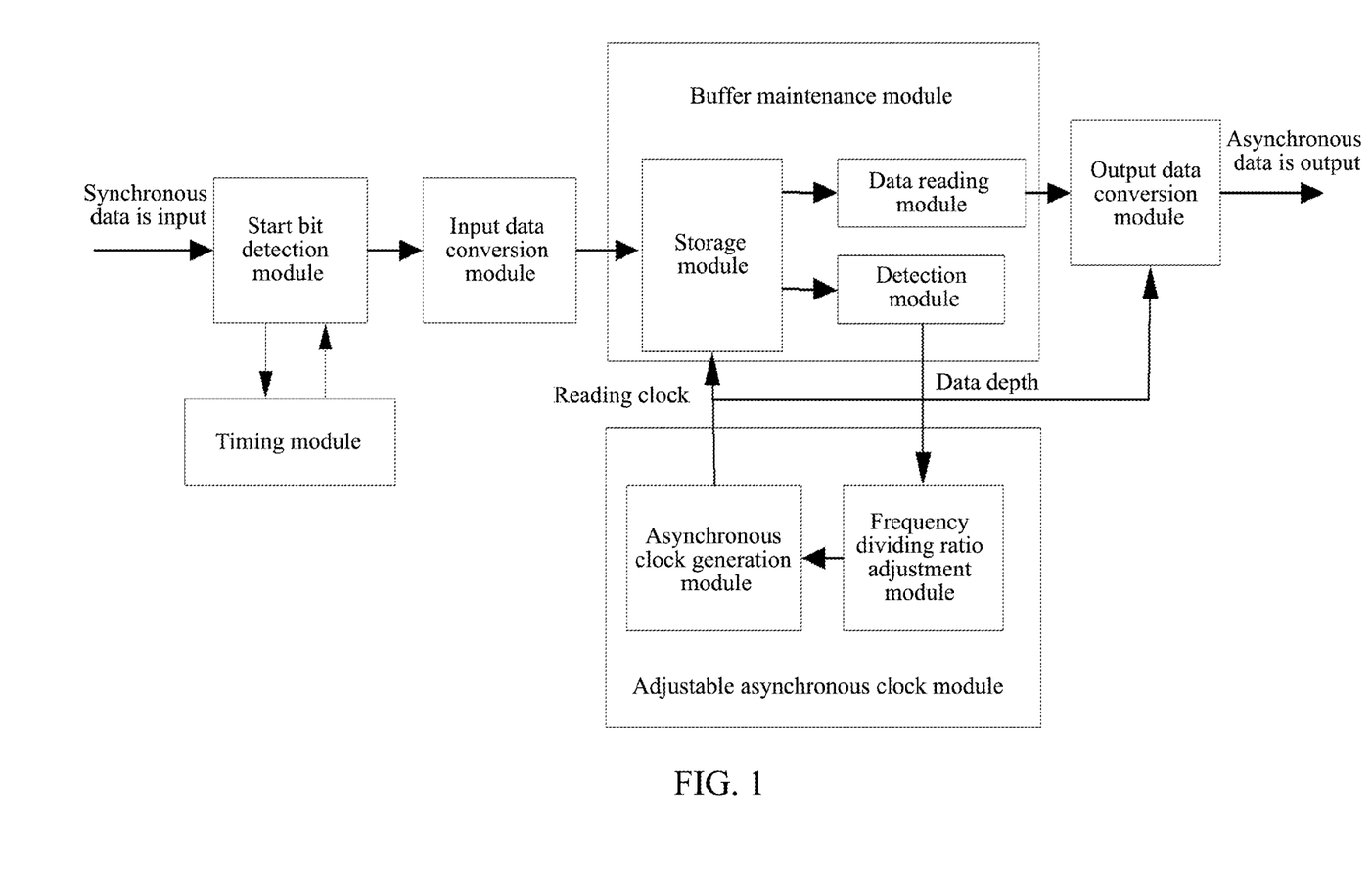
FIG. 1 is a structural diagram of a receiving end of a transmission system according to an embodiment of the present invention.
Figure 2:
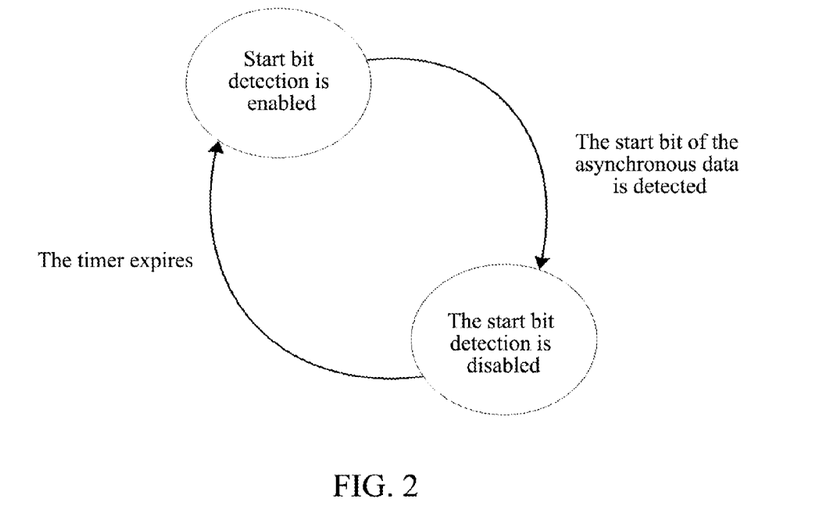
FIG. 2 is a state transition diagram of a start bit detection module.

The present embodiment provides a transmission system which supports synchronously transmitting asynchronous data, comprising a transmitting end and a receiving end, wherein, the transmitting end is configured to encapsulate the asynchronous data into a synchronous data frame, and synchronously transmit it to a receiving end; and the receiving end is configured to receive and de-encapsulate the synchronous data, write the asynchronous data into a buffer of the receiving end, read the asynchronous data in the buffer by using a reading clock of the asynchronous data and output the asynchronous data to a receiving apparatus for the asynchronous data;

as shown in FIG. 1, the receiving end comprises a start bit detection module, a buffer maintenance module, an adjustable asynchronous clock module and a timing module, wherein, the start bit detection module is configured to receive and de-encapsulate the synchronous data, detect a start bit of the asynchronous data in a synchronous data frame, and when the start bit of the asynchronous data is detected, notify the timing module, stop the detection, and transmit the asynchronous data to the buffer maintenance module, and when the timer expires, resume the detection. The state transition diagram of the start bit detection module is shown in FIG. 2.

The timing module is configured to receive a notification of the start bit detection module, start a timer, and when the timer expires, notify the start bit detection module, wherein a time length of the timer is equal to a time length for serial transmission of one asynchronous data package.

Figure 3:
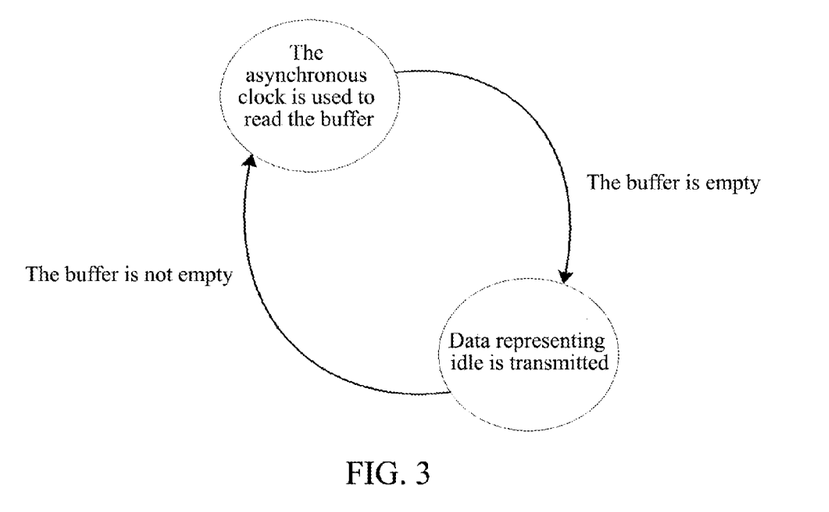
FIG. 3 is a state transition diagram of a buffer maintenance module.

The buffer maintenance module is configured to store the asynchronous data into a buffer, detect a data depth of the buffer, use the reading clock provided by the adjustable asynchronous clock module to read the asynchronous data in the buffer, output the asynchronous data to the receiving apparatus for the asynchronous data, and output data representing idle when detecting that the buffer is empty. The state transition diagram of the buffer maintenance module is shown in FIG. 3.

The buffer maintenance module comprises a detection module, a storage module, and a data reading module, wherein, the detection module is configured to detect the data depth of the storage module in real time, and provide the data depth information to a frequency dividing ratio adjustment module;

the storage module comprises a buffer, and the storage module is configured to store the asynchronous data obtained through the start bit detection module performing de-encapsulation; and the data reading module is configured to read and output the data in the storage module by using the reading clock, and if detecting that the reading clock stops, output data representing idle.

The adjustable asynchronous clock module is configured to provide the reading clock of the asynchronous data, and use the data depth information of the buffer to adjust the frequency of the reading clock, and when the data depth in the buffer increases, increase the frequency of the reading clock.

The adjustable asynchronous clock module comprises an asynchronous clock generation module and a frequency dividing ratio adjustment module, wherein, the asynchronous clock generation module is configured to generate the reading clock of the asynchronous data according to the frequency dividing ratio of the frequency dividing ratio adjustment module and provide the reading clock to the buffer maintenance module.

The frequency dividing ratio adjustment module is configured to: when detecting that the buffer is changed from empty to non-empty, determine that the frequency dividing ratio is a value obtained through a local high-speed clock divided by a baud rate of the asynchronous data, and transmit the frequency dividing ratio to the asynchronous clock generation module, and also use the data depth information of the buffer to determine the frequency dividing ratio of the reading clock and transmit the frequency dividing ratio to the asynchronous clock generation module, and when it is detected that the data depth in the buffer increases, reduce the frequency dividing ratio, and when it is detected that the buffer is empty, notify the asynchronous clock generation module to stop the reading clock.

The frequency dividing ratio adjustment module is further configured to record k thresholds set for the data depth of the buffer, with each threshold f(i) of the data depth and an adjustment value of a corresponding frequency dividing ratio, and the adjustment value being less than or equal to a set maximum value, wherein, k is a positive integer, f(i) is a positive integer and f(i)<f(i+1), and i is a positive integer and i∈[1, k].

The frequency dividing ratio adjustment module periodically obtains the data depth information of the buffer, for example, the current data depth of the buffer is greater than f(i−1) and less than f(i), and if detecting that the data depth increases and exceeds the threshold f(i), the frequency dividing ratio adjustment module reduces a current frequency dividing ratio by using the adjustment value corresponding to the threshold f(i), and transmits the adjusted frequency dividing ratio to the asynchronous clock generation module.

When receiving the asynchronous data and converting the asynchronous data into synchronous data for output, the transmitting end in the present embodiment encapsulates the asynchronous data into the synchronous data frame, which is synchronously transmitted to the receiving end; when receiving the synchronous data and converting the received synchronous data into asynchronous data to output it to a receiving apparatus for the asynchronous data, the receiving end adjusts the frequency of the reading clock according to the data depth in the buffer, and when the data depth in the buffer increases, the frequency of the reading clock increases, and when the buffer is empty, the receiving end outputs data representing idle to the receiving apparatus for the asynchronous data.

The processing method for the transmitting end to encapsulate the asynchronous data into a synchronous data frame and synchronously transmit the synchronous data frame to the receiving end is the same as those in the related art, and the transmitting end receives the asynchronous data and writes the asynchronous data in the buffer of the transmitting end, reads the asynchronous data package in the buffer of the transmitting end and encapsulates the asynchronous data package into the synchronous data frame, and synchronously transmits the synchronous data frame to the receiving end. When the buffer of the transmitting end is read completely, the data representing idle is filled in the synchronous data frame.

When the state of the buffer of the receiving end is changed from empty to non-empty, the receiving end performs frequency division on the local high-speed clock, and it generates a reading clock with the frequency being identical with the baud rate of the asynchronous data, and when the data in the buffer is read completely, it stops the reading clock and transmits data representing idle to an external receiving apparatus for the asynchronous data.

The data depth of the buffer of the receiving end is set as k thresholds, and for each threshold f(i) of the data depth, an adjustment value corresponding to the frequency of the reading clock and a maximum value of the adjustment value are set, wherein, k is a positive integer, f(i) is a positive integer and f(0<f(i+1), and i is a positive integer and i∈[1, k]. The receiving end detects the data depth of the buffer in real time, and when the data depth increases and exceeds the threshold f(i), the frequency of the current reading clock is increased by using the adjustment value corresponding to the threshold f(i).

Figure 4:
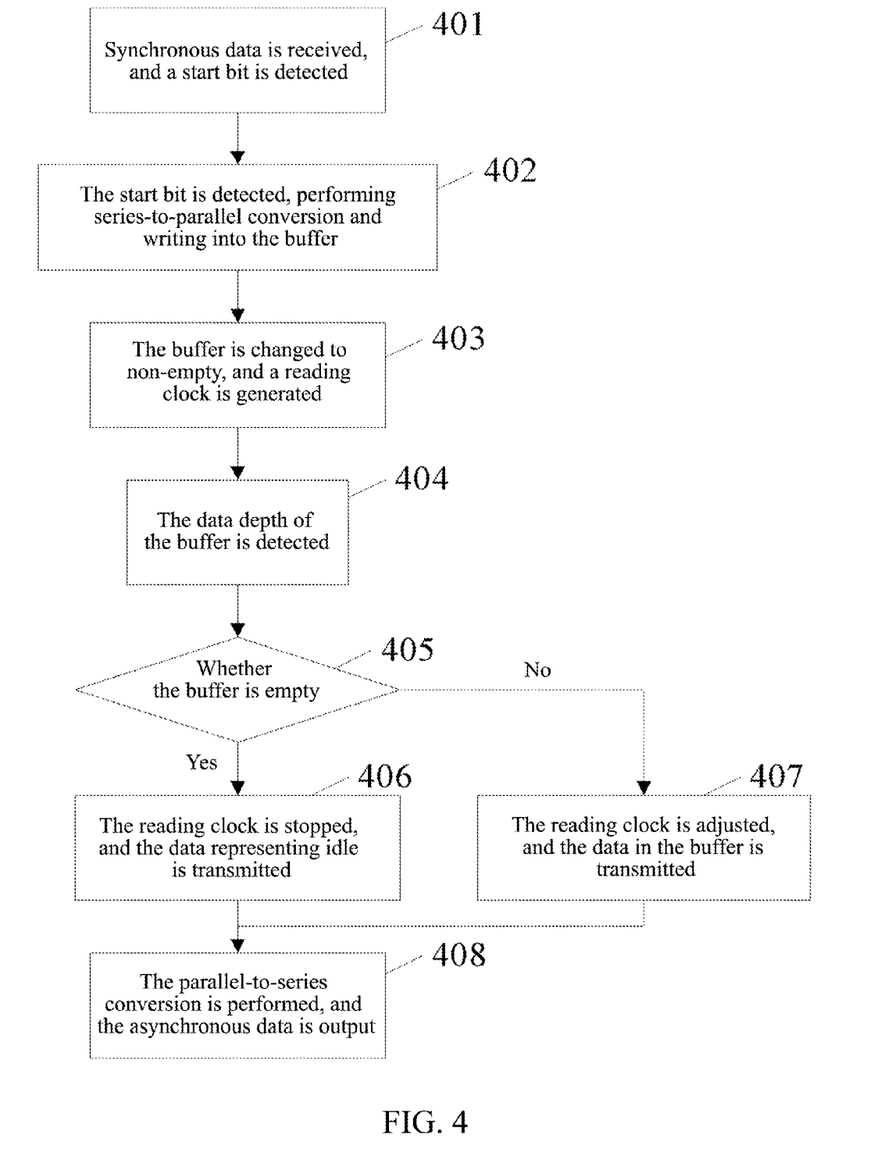
FIG. 4 is a processing flow chart of a receiving end receiving synchronous data and converting the synchronous data into asynchronous data for output according to an embodiment of the present invention.

In a method for synchronously transmitting asynchronous data according to the present embodiment, the process of the receiving end receiving the synchronous data and converting the synchronous data into asynchronous data for output comprises the following steps, as shown in FIG. 4:

In step 401, the receiving end receives the synchronous data, and detects a start bit of the asynchronous data in the input synchronous data frame; and the receiving end samples the synchronous data frame using a clock with a frequency being not less than 8 times of the baud rate of the asynchronous data, and when the start bit of the asynchronous data is detected, detecting the start bit of the asynchronous data is stopped, and a timer is started at the same time, and the time length of the timer is the same as the time length for transmitting one asynchronous data package, and after the timer expires, the start bit of the asynchronous data in the synchronous data frame is re-detected.

In step 402, when the start bit of the asynchronous data is detected, the asynchronous data is written into the buffer;

In step 403, the buffer is changed from empty to non-empty, and the receiving end generates a reading clock with the frequency being identical with the baud rate of the asynchronous data and reads the data in the buffer by using the reading clock; and the reading clock is obtained from the frequency division of the local high-speed clock.

In step 404, the receiving end detects the state of the buffer of the receiving end in real time, and periodically obtains data depth information of the buffer;

In step 405, it is judged whether the buffer is empty, and if the buffer is empty, proceed to step 406; otherwise, proceed to step 407;

In step 406, the reading clock is stopped, which is the same as related art, and the data representing idle is transmitted, and proceed to step 408;

In step 407, the frequency of the reading clock is adjusted according to the data depth information, and when the data depth increases, the frequency of the reading clock is increased;

In step 408, the data in the buffer is read by using the reading clock, and the data is transmitted to the external receiving apparatus for the asynchronous data.

In step 407, the data depth of the buffer of the receiving end is set as k thresholds, and for each threshold f(i) of the data depth, an adjustment value of frequency corresponding to the frequency of the reading clock and a maximum value of the adjustment value are set, wherein, k is a positive integer, f(i) is a positive integer and f(i)<f(i+1), and i is a positive integer and i∈[1, k].

The receiving end detects the data depth of the buffer in real time, and assuming that the current data depth of the buffer is greater than f(i−1) and less than f(i), if the data depth increases and exceeds the threshold f(i), the frequency of the current reading clock is increased by using the adjustment value corresponding to the threshold f(i).

Embodiment Two

As the reading clock is obtained by the frequency division of the local high-speed clock, the frequency of the reading clock can be adjusted by using a rational number frequency division method. When the data depth in the buffer increases, the frequency of the reading clock is increased by reducing a rational number frequency dividing ratio.

The receiving end of the transmission system supporting synchronously transmitting asynchronous data according to the present embodiment comprises: a start bit detection module, a buffer maintenance module, an adjustable asynchronous clock module, a timing module, an input data conversion module and an output data conversion module, wherein, the start bit detection module, the buffer maintenance module and the timing module are the same as those of embodiment one.

The input data conversion module is configured to receive data transmitted by the start bit detection module, convert the data into parallel data, and transmit the parallel data to the buffer maintenance module.

The input data conversion module uses a writing clock generated by the frequency division of a local oscillator to write the parallel data into the buffer maintenance module, which is the same as the related art, and the frequency of the writing clock is determined according to a format of the asynchronous data, which is the same as a value obtained through the frequency of the asynchronous clock divided by the number of bits occupied by the asynchronous data, and if the asynchronous data includes a Cyclic Redundancy Check (CRC) bit, i.e. occupying 11 bits, the frequency of the writing clock is equal to a value obtained through the frequency of the asynchronous clock divided by 11, and if the asynchronous data does not include a CRC bit, i.e. occupying 10 bits, the frequency of the writing clock is equal to a value obtained through the frequency of the asynchronous clock divided by 10.

The output data conversion module is configured to receive the parallel data transmitted by the buffer maintenance module, convert the parallel data into serial data, and output it to an external receiving apparatus for the asynchronous data.

The clock used by the output data conversion module to receive the parallel data and convert it into serial data is the reading clock output by the adjustable asynchronous clock module, and the frequency of the clock for transmitting the serial data is equal to a value obtained through the frequency of the reading clock multiplied by the number of bits occupied by one asynchronous data package.

The adjustable asynchronous clock module is configured to provide the reading clock of the asynchronous data, and use data depth information of the buffer to adjust the frequency of the reading clock, and increase the frequency of the reading clock when the data depth in the buffer increases. The adjustable asynchronous clock module comprises an asynchronous clock generation module and a frequency dividing ratio adjustment module, wherein, the asynchronous clock generation module is the same as that in embodiment one; and the frequency dividing ratio adjustment module is configured to: when it is detected that the buffer is changed from empty to non-empty, determine that the frequency dividing ratio is an integer ratio obtained by a local high-speed clock divided by a baud rate of the asynchronous data and then divided by the number of bits occupied by one asynchronous data package according to a rational number frequency division method, and transmit the frequency dividing ratio to the asynchronous clock generation module, and according to the rational number frequency division method, use the data depth information of the buffer to determine the frequency dividing ratio of the reading clock and transmit the frequency dividing ratio to the asynchronous clock generation module, and when it is detected that the data depth in the buffer increases, reduce the frequency dividing ratio, and when it is detected that the buffer is empty, notify the asynchronous clock generation module to stop the reading clock.

Specifically, the frequency dividing ratio adjustment module records information that a buffer with the data depth being Y is set as k segments, wherein, Y>k and both Y and k are positive integers;

if it is detected that the buffer of the receiving end is changed from empty to non-empty, the frequency dividing ratio adjustment module determines that the frequency dividing ratio is an integer ratio obtained through a local high-speed clock whose frequency is Q multiplied by a number of bits f occupied by one asynchronous data package and then divided by a baud rate P of the asynchronous data, and according to a rational number frequency division method, the rational number frequency dividing ratio in the rational number frequency division method is $(Q \times f)/P$, wherein, $Q >= (10 \times P/f) > 0$, and both nominal values m and n are positive integers.

If it is detected that the buffer of the receiving end is non-empty, the frequency dividing ratio adjustment module periodically obtains the data depth information of the buffer, and if the data depth increases and exceeds $j \times Y/k$, m is adjusted as $(m-(2^j \times T))_{round\ down}$, wherein, j represents a segment value of the current data depth, j is a positive integer and $j <= k$, T is an adjusted stepping rate and $T > 0$, and in order to ensure the accuracy and stability of the reading clock, in the present embodiment, it is stipulated that the adjustment of the frequency does not exceed 3% of the original nominal value determined according to the rational number frequency division method, and therefore, $(\Sigma_{i=1}^{k} 2^i \times T) \leq (t \times m)$, wherein, $t = 0.03$, and the value of T is adjustable.

According to the obtained data depth information of the buffer, if it is determined that the buffer overflows, the frequency dividing ratio adjustment module increases the value of T.

The method for synchronously transmitting asynchronous data according to the present embodiment uses a rational number frequency division method to adjust the frequency of the reading clock. Assume that the buffer of the receiving end can store Y asynchronous data packages at most, then the depth of the buffer is considered as Y. First, the buffer with the depth being Y is divided into k segments, wherein, both Y and k are positive integers, and $Y >= k$, then the data depth of each segment is $Y/k$, and the data depth of the $i^{th}$ segment is $i \times Y/k$, wherein, i is a positive integer and $i <= k$.

The process for the receiving end to receive the synchronous data and convert it into asynchronous data comprises the following steps:

step 501 is the same as step 401 in embodiment one;

In step 502, when a start bit of the asynchronous data is detected, a series-to-parallel conversion is performed on the asynchronous data, and the obtained parallel data is written into the buffer;

The receiving end uses a writing clock generated by the frequency division of a local oscillator to write the parallel data into the buffer maintenance module, which is the same as the related art, and the frequency of the writing clock is determined according to a format of the asynchronous data, which is equal to a value obtained through the frequency of the asynchronous clock divided by the number of bits occupied by one asynchronous data package, and if the asynchronous data includes a CRC bit, i.e. occupying 11 bits, the frequency of the writing clock is equal to a value obtained through the frequency of the asynchronous clock divided by 11, and if the asynchronous data does not include a CRC bit, i.e. occupying 10 bits, the frequency of the writing clock is equal to a value obtained through the frequency of the asynchronous clock divided by 10.

The buffer is counted by using a counter, and the initial value of the counter is 0, when one parallel data is written into the buffer, the counter increases by 1, and when one parallel data is read from the buffer, the counter decreases by 1, thereby detecting the data depth of the buffer in real time.

In step 503, when the buffer is changed from empty to non-empty, the receiving end generates a reading clock with the frequency being identical with the baud rate of the asynchronous data, and the data in the buffer is read by using the reading clock;

According to a rational number frequency division method, if the rational number frequency division is performed on the clock with a frequency being Q to obtain a clock with a frequency being P/f, wherein Q>=(10×P/f)>0, the frequency dividing ratio is m/n=(Q×f)/P, wherein, m/n is the simplest integer ratio, and both nominal values of m and n are positive integers, P is the baud rate of the asynchronous data, and f is the number of bits occupied by one asynchronous data package. In order to facilitate the program to control the frequency division, in the present embodiment, the numerator of the frequency dividing ratio is selected as an even, and therefore, if m in the above frequency dividing ratio is an even, the simplest integer ratio is m/n=(Q×f)/P, and if m is an odd, the final frequency dividing ratio is 2m/2n=(Q×f)/P. For example, if a clock with 56 KHZ is obtained from frequency division of a clock with 32.768 MHZ, the final frequency dividing ratio is m/n=4096/7.

The processes of steps 504-506 are the same as those of steps 403-406 in embodiment one;

in step 507, the frequency of the reading clock is adjusted according to the data depth information, and when the data depth increases, the frequency of the reading clock is increased;

in step 508, the data in the buffer is read in parallel by using the reading clock, and a parallel-to-series conversion is performed on the data, and the asynchronous data is output.

The clock used by the receiving end to convert the parallel data into the serial data is the reading clock, and the frequency of the used clock for transmitting the serial data is equal to a value obtained through the frequency of the reading clock multiplied by the number of bits occupied by one asynchronous data package.

Figure 5:
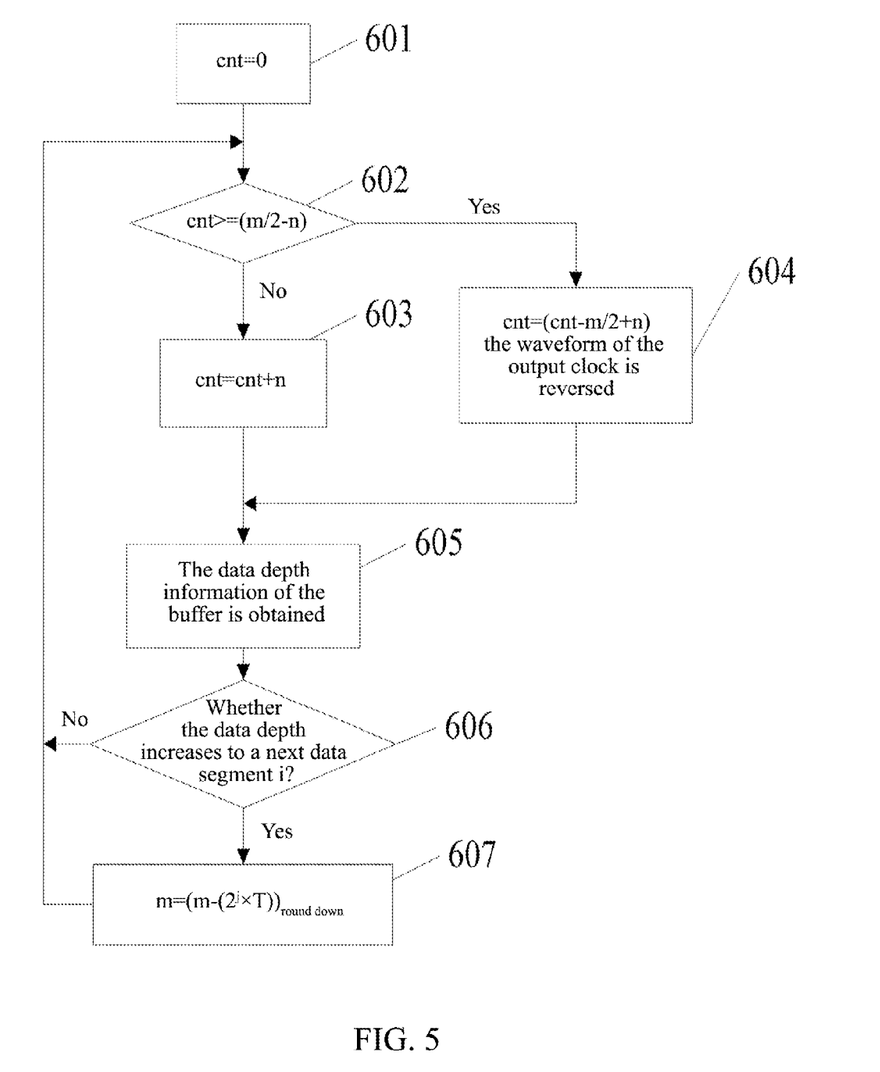
FIG. 5 is a flowchart of a receiving end adjusting the frequency of a reading clock according to an embodiment of the present invention.

In the above step 507, assume that the nominal value m is an even, and according to the rational number frequency division method in the related art, one counter with an initial value being 0 is started to perform counting on the local high-speed clock, and the counter increases by n per clock cycle, and if the value of the counter is less than (m/2)−n, the waveform of the output clock remains unchanged, and if the value of the counter is greater than (m/2)−n, the waveform of the output clock is reversed, (m/2)−n is subtracted from the value of the counter, and the counting continues. Thus, the required clock is obtained by using the frequency dividing ratio m/n. The present embodiment decreases the frequency dividing ratio by reducing the value of m, thus increasing the frequency of the reading clock. As shown in FIG. 5, the following steps are comprised:

in step 601, when the state of the buffer is changed from empty to non-empty, a counter cnt is started, and the initial value is 0;

the counter cnt is used to perform frequency division processing on the local high-speed clock.

In step 602, whether the value of cnt is greater than or equal to (m/2)−n is judged per local high-speed clock cycle, and if the value of cnt is greater than or equal to (m/2)−n, proceed to step 604; otherwise, proceed to step 603;

in step 603, the value of cnt increases by n, and proceed to step 605;

in step 604, the value of cnt−(m/2)+n is assigned to cnt, and the waveform of the output reading clock is reversed;

in step 605, the data depth information of the buffer is obtained;

in step 606, whether the data depth of the buffer increases is judged, and if the data depth of the buffer increases, proceed to step 607; otherwise, return to step 602;

In step 607, the value of m is adjusted according to the data depth information of the buffer.

If the current data depth of the buffer is greater than or equal to $j \times Y/k$ and less than $(j+1) \times Y/k$, wherein, j represents a segment value of the current data depth in the buffer, j is a positive integer and $j \leq k$, then the value of m is adjusted as $(m-(2^j \times T))_{round\ down}$, wherein, T is an adjusted stepping rate, and T>0. In order to ensure the accuracy and stability when the data in the buffer is read, the rational number frequency dividing ratio can only be fine adjusted, and the adjustment of the frequency defined by the present embodiment increases at most 3% of the original nominal value m determined by the rational number frequency division method, and therefore, $(\Sigma_{i=1}^{k} 2^i \times T) \leq (t \times m)$, wherein, t=0.03. As the value of m is adjusted as $(m-(2^j \times T))_{round\ down}$ when the data depth in the buffer increases to j at present, the greater the j is, the fuller the data in the buffer is, the greater the adjustment of value of m is, and therefore, the more the frequency of the reading clock increases, thereby avoiding the data in the buffer from overflowing. Further, the value of T is adjustable, and if after the processing of the above steps 601-607, the buffer still overflows, the value of T is increased and the processing is performed according to the same modes.

The receiving end according to the present embodiment may also not use the input data conversion module and the output data conversion module, i.e. when the asynchronous data is written into the buffer, the series-to-parallel conversion is not performed on the data, and when the asynchronous data is read from the buffer, the parallel-to-series conversion is not performed on the data. Correspondingly, the depth Y of the buffer represents the depth of the buffer by using other modes such as bytes or bits etc.

In embodiment one and embodiment two, the receiving end adjusts the frequency of the reading clock according to the data depth of the buffer, and except for the rational number frequency division method, there are other methods to be used, and if the data depth of the buffer reaches to a certain threshold, the frequency of the reading clock is increased by a fixed value, or the added value and the data depth form a linear relationship or other functional relationships; alternatively, the rational number frequency division method is used, but an adjustment method where there are other functional relationships with the data depth information is used. In the present embodiment, the data depth of the buffer is detected once every high-speed clock cycle, or each time the waveform of the reading clock is reversed, the data depth of the buffer can be detected.

The present invention further provides a receiving apparatus for synchronously transmitting asynchronous data, comprising a start bit detection module, a buffer maintenance module and an adjustable asynchronous clock module, wherein, the start bit detection module is configured to receive synchronous data synchronously transmitted to a receiving end by a transmitting end after encapsulating the asynchronous data into a synchronous data frame, de-encapsulate the received synchronous data, and transmit the obtained asynchronous data to the buffer maintenance module;

the buffer maintenance module is configured to write the asynchronous data into a buffer, detect a data depth of the buffer and provide the data depth to the adjustable asynchronous clock module, use the reading clock provided by the adjustable asynchronous clock module to read the asynchronous data in the buffer, output the asynchronous data to the receiving apparatus for the asynchronous data, and output data representing idle when it is detected that the buffer is empty; and the adjustable asynchronous clock module is configured to provide the reading clock of the asynchronous data, and use data depth information of the buffer to adjust the frequency of the reading clock, and increase the frequency of the reading clock when the data depth in the buffer increases.

The adjustable asynchronous clock module comprises a frequency dividing ratio adjustment module and an asynchronous clock generation module, wherein, the frequency dividing ratio adjustment module is configured to: when it is detected that the buffer is changed from empty to non-empty, determine a frequency dividing ratio of the reading clock of the asynchronous data, wherein, the frequency dividing ratio is a value obtained through a local high-speed clock divided by a baud rate of the asynchronous data, or a value obtained through the local high-speed clock multiplied by the number of bits occupied by one asynchronous data package and then divided by the baud rate of the asynchronous data; and transmit the frequency dividing ratio to the asynchronous clock generation module, use the data depth information of the buffer to determine the frequency dividing ratio of the reading clock and transmit the frequency dividing ratio to the asynchronous clock generation module, and when it is detected that the data depth in the buffer increases, reduce the frequency dividing ratio, and when it is detected that the buffer is empty, notify the asynchronous clock generation module to stop the reading clock; and the asynchronous clock generation module is configured to generate the reading clock of the asynchronous data according to the frequency dividing ratio of the frequency dividing ratio adjustment module and provide the reading clock to the buffer maintenance module.

The frequency dividing ratio adjustment module is further configured to record k thresholds set for the data depth of the buffer, with each threshold f(i) of the data depth and an adjustment value of a corresponding frequency dividing ratio, and the adjustment value being less than or equal to a set maximum value, wherein, k is a positive integer, f(i) is a positive integer and f(0<f(i+1), and i is a positive integer and i∈[1, k]; obtain the data depth information of the buffer periodically, and if it is detected that the data depth increases and exceeds the threshold f(i), reduce a current frequency dividing ratio by using the adjustment value corresponding to the threshold f(i), and transmit the adjusted frequency dividing ratio to the asynchronous clock generation module.

The frequency dividing ratio adjustment module is further configured to adjust the frequency of the reading clock by using data depth information of the buffer, and perform adjustment according to a rational number frequency division method, and when it is detected that the data depth in the buffer increases, reduce a nominal value of a rational number frequency dividing ratio.

The frequency dividing ratio adjustment module is further configured to record information that a buffer with the data depth being Y is set as k segments, wherein, Y>k and both Y and k are positive integers;

when it is detected that the buffer of the receiving end is changed from empty to non-empty, determine that the frequency dividing ratio is m/n, wherein, both nominal values m and n are positive integers;

when it is detected that the buffer of the receiving end is non-empty, periodically obtain the data depth information of the buffer, and if the data depth increases and exceeds j×Y/k, adjust m as $(m-(2^j \times T))_{round\ down}$, wherein, j represents a segment value of the current data depth, j is a positive integer and j<=k, T is an adjusted stepping rate, T>0 and $(\Sigma_{i=1}^{k} 2^i \times T)$ ≤(t×m), t is a maximum amplitude for the adjustment of the original nominal value m which is determined according to the rational number frequency division method, 0<t<1, and the value of T is adjustable; and if it is detected that the buffer overflows, increase the value of T.

The buffer maintenance module comprises a detection module, a storage module, and a data reading module, wherein, the detection module is configured to detect the data depth of the storage module in real time, and provide the data depth information to the frequency dividing ratio adjustment module;

the storage module comprises a buffer, and the storage module is configured to store the asynchronous data obtained through the start bit detection module performing de-encapsulation; and the data reading module is configured to read and output the data in the storage module by using the reading clock, and if it is detected that the reading clock stops, output data representing idle.

The apparatus further comprises an input data conversion module, an output data conversion module and a timing module, wherein, the input data conversion module is located between the start bit detection module and the buffer maintenance module, and the output data conversion module is located at an output end of the buffer maintenance module, and wherein, the input data conversion module is configured to receive data transmitted by the start bit detection module, convert the data into parallel data, and transmit the parallel data to the buffer maintenance module;

the output data conversion module is configured to receive the data transmitted by the buffer maintenance module, and convert the data into serial data for output;

the timing module is configured to receive a notification of the start bit detection module, start a timer, and when the timer expires, notify the start bit detection module, wherein a time length of the timer is equal to a time length for serial transmission of one asynchronous data package; and the start bit detection module is further configured to detect a start bit of the asynchronous data in the synchronous data frame, and when the start bit of the asynchronous data is detected, notify the timing module and stop the detection, and when the timer expires, resume the detection.

A person having ordinary skill in the art can understand that all or a part of steps in the above method can be implemented by programs instructing related hardware, and the programs can be stored in a computer readable storage medium, such as a read-only memory, disk or CD-ROM etc.

Alternatively, all or a part of steps in the above embodiments can also be implemented by one or more integrated circuits. Accordingly, each module/unit in the above embodiments can be implemented in a form of hardware, or can also be implemented in a form of software functional module. The present invention is not limited to any particular form of the combination of hardware and software.

For those skilled in the art, any modification, equivalent substitution, improvement and so on which are made within the spirit and principle of the present invention should belong to the scope of the claims of the present invention.

INDUSTRIAL APPLICABILITY

The present invention provides a simple and effective method for synchronously transmitting asynchronous data, which solves the problem of the slip code when synchronously transmitting asynchronous data continuously. In addition, the present invention effectively avoids data in the buffer from overflowing, so that the adjustment of the frequency of the reading clock is more flexible, which further effectively avoids data in the buffer from overflowing.

What is claimed is:

1. A transmission method for synchronously transmitting asynchronous data, comprising:
    a transmitting end encapsulating the asynchronous data into a synchronous data frame, which is synchronously transmitted to a receiving end; and
    the receiving end receiving and de-encapsulating synchronous data, writing the obtained asynchronous data into a buffer of the receiving end, reading the asynchronous data by using a reading clock of the asynchronous data and outputting the asynchronous data to a receiving apparatus for the asynchronous data; wherein, the receiving end also adjusts a frequency of the reading clock by using data depth information of the buffer, increases the frequency of the reading clock when data depth in the buffer increases and outputs data representing idle when the buffer is empty.

2. The method according to claim 1, further comprising:
    when the buffer of the receiving end is changed from empty to non-empty, the receiving end performing frequency division on a local high-speed clock, wherein, a generated frequency of the reading clock is the same as a baud rate of the asynchronous data or is equal to a value which is obtained through a baud rate of asynchronous clock module divided by the number of bits occupied by one asynchronous data package.

3. The method according to claim 2, wherein,
    the buffer with the data depth of the receiving end being Y is divided into k segments, wherein, Y>k and both Y and k are positive integers;
    when the buffer of the receiving end is changed from empty to non-empty, a rational number frequency dividing ratio of the reading clock generated by the receiving end using a local high-speed clock is m/n, wherein, both nominal values m and n are positive integers;
    when the buffer of the receiving end is non-empty, the receiving end detects the data depth of the buffer in real time, and when the data depth increases and exceeds $j \times Y/k$, m is adjusted as $(m-(2^j \times T))_{round\ down}$, wherein, j represents a segment value of current data depth, j is a positive integer and j<=k, T is an adjusted stepping rate, T>0 and $(\sum_{i=1}^{k} 2^i \times T) \leq (t \times m)$, wherein, t is a maximum amplitude for adjustment of an original nominal value m which is determined according to a rational number frequency division method, 0<t<1, and the value of T is adjustable; and
    if the buffer overflows according to the value of T which is set originally, the value of T is increased.

4. The method according to claim 2, wherein,
    the data depth of the buffer of the receiving end is set as k thresholds, and for each threshold f(i) of the data depth, an adjustment value corresponding to the frequency of the reading clock and a maximum value of the adjustment value are set, wherein, k is a positive integer, f(i) is a positive integer and f(i)<f(i+1), and i is a positive integer and i∈[1, k];
    the receiving end detects the data depth of the buffer in real time, and when the data depth increases and exceeds the threshold f(i), a frequency of a current reading clock is increased by using the adjustment value corresponding to the threshold f(i); and
    when data in the buffer of the receiving end is read completely, the reading clock is also stopped.

5. The method according to claim 1, wherein,
    the receiving end adjusting the frequency of the reading clock by using the data depth information of the buffer comprises performing adjustment according to a rational number frequency division method, and when the data depth in the buffer increases, the frequency of the reading clock is increased by reducing a rational number frequency dividing ratio.

6. The method according to claim 5, wherein,
    the buffer with the data depth of the receiving end being Y is divided into k segments, wherein, Y>k and both Y and k are positive integers;
    when the buffer of the receiving end is changed from empty to non-empty, the rational number frequency dividing ratio of the reading clock generated by the receiving end using a local high-speed clock is m/n, wherein, both nominal values m and n are positive integers;
    when the buffer of the receiving end is non-empty, the receiving end detects the data depth of the buffer in real time, and when the data depth increases and exceeds $j \times Y/k$, m is adjusted as $(m-(2^j \times T))_{round\ down}$, wherein, j represents a segment value of current data depth, j is a positive integer and j<=k, T is an adjusted stepping rate, T>0 and $(\sum_{i=1}^{k} 2^i \times T) \leq (t \times m)$, wherein, t is a maximum amplitude for adjustment of an original nominal value m which is determined according to the rational number frequency division method, 0<t<1, and the value of T is adjustable; and
    if the buffer overflows according to the value of T which is set originally, the value of T is increased.

7. A transmission system for synchronously transmitting asynchronous data, comprising a transmitting end and a receiving end, wherein,
    the transmitting end is configured to encapsulate the asynchronous data into a synchronous data frame, which is then synchronously transmitted to the receiving end;
    the receiving end is configured to receive and de-encapsulate synchronous data, write the obtained asynchronous data into a buffer of the receiving end, read the asynchronous data by using a reading clock of the asynchronous data and output the asynchronous data to a receiving apparatus for the asynchronous data;
    the receiving end comprises a start bit detection module, a buffer maintenance module and an adjustable asynchronous clock module, wherein, the start bit detection module is configured to receive and de-encapsulate the synchronous data, and transmit the obtained asynchronous data to the buffer maintenance module;

the buffer maintenance module is configured to write the asynchronous data into the buffer, and detect a data depth of the buffer and provide the data depth to the adjustable asynchronous clock module, and use the reading clock provided by the adjustable asynchronous clock module to read the asynchronous data in the buffer, and output the asynchronous data to the receiving apparatus for the asynchronous data, and output data representing idle when detecting that the buffer is empty;

the adjustable asynchronous clock module is configured to provide the reading clock of the asynchronous data, and use data depth information of the buffer to adjust a frequency of the reading clock, and increase the frequency of the reading clock when the data depth in the buffer increases.

8. A receiving apparatus for synchronously transmitting asynchronous data, comprising a start bit detection module, a buffer maintenance module and an adjustable asynchronous clock module, wherein, the start bit detection module is configured to receive synchronous data synchronously transmitted to a receiving end by a transmitting end after encapsulating the asynchronous data into a synchronous data frame, de-encapsulate the received synchronous data, and transmit the obtained asynchronous data to the buffer maintenance module;

the buffer maintenance module is configured to write the asynchronous data into a buffer, and detect a data depth of the buffer and provide the data depth to the adjustable asynchronous clock module, and use a reading clock provided by the adjustable asynchronous clock module to read the asynchronous data in the buffer, and output the asynchronous data to a receiving apparatus for the asynchronous data, and output data representing idle if detecting that the buffer is empty; and the adjustable asynchronous clock module is configured to provide the reading clock of the asynchronous data, and use data depth information of the buffer to adjust a frequency of the reading clock, and increase the frequency of the reading clock when data depth in the buffer increases.

9. The apparatus according to claim 8, wherein, the buffer maintenance module comprises a detection module, a storage module, and a data reading module, wherein, the detection module is configured to detect the data depth of the storage module in real time, and provide the data depth information to a frequency dividing ratio adjustment module;

the storage module comprises the buffer, and the storage module is configured to store the asynchronous data obtained through the start bit detection module performing de-encapsulation; and the data reading module is configured to read and output data in the storage module by using the reading clock, and if detecting that the reading clock stops, output data representing idle.

10. The apparatus according to claim 8, wherein, the adjustable asynchronous clock module comprises a frequency dividing ratio adjustment module and an asynchronous clock generation module, wherein, the frequency dividing ratio adjustment module is configured to: when detecting that the buffer is changed from empty to non-empty, determine a frequency dividing ratio of the reading clock of the asynchronous data, wherein, the frequency dividing ratio is a value obtained through a local high-speed clock divided by a baud rate of the asynchronous data, or a value obtained through the local high-speed clock multiplied by the number of bits occupied by one asynchronous data package and then divided by the baud rate of the asynchronous data; and transmit the frequency dividing ratio to the asynchronous clock generation module, and use the data depth information of the buffer to determine the frequency dividing ratio of the reading clock and transmit the frequency dividing ratio to the asynchronous clock generation module, and when detecting that the data depth in the buffer increases, reduce the frequency dividing ratio, and when detecting that the buffer is empty, notify the asynchronous clock generation module to stop the reading clock; and the asynchronous clock generation module is configured to generate the reading clock of the asynchronous data according to the frequency dividing ratio of the frequency dividing ratio adjustment module and provide the reading clock to the buffer maintenance module.

11. The apparatus according to claim 10, wherein, the frequency dividing ratio adjustment module is further configured to record k thresholds set for the data depth of the buffer, with each threshold f(i) of the data depth and an adjustment value of a corresponding frequency dividing ratio, and the adjustment value being less than or equal to a set maximum value, wherein, k is a positive integer, f(i) is a positive integer and f(i)<f(i+1), and i is a positive integer and i∈[1, k]; obtain the data depth information of the buffer periodically, and if detecting that the data depth increases and exceeds the threshold f(i), reduce a current frequency dividing ratio by using the adjustment value corresponding to the threshold f(i), and transmit the adjusted frequency dividing ratio to the asynchronous clock generation module.

12. The apparatus according to claim 10, wherein, the frequency dividing ratio adjustment module is further configured to adjust the frequency of the reading clock by using the data depth information of the buffer, and perform adjustment according to a rational number frequency division method, and when detecting that the data depth in the buffer increases, reduce a nominal value of a rational number frequency dividing ratio.

13. The apparatus according to claim 12, wherein, the frequency dividing ratio adjustment module is further configured to record information that the buffer with the data depth being Y is set as k segments, wherein, Y>k and both Y and k are positive integers;

when detecting that the buffer of the receiving end is changed from empty to non-empty, determine that the frequency dividing ratio is m/n, wherein, both nominal values m and n are positive integers;

when detecting that the buffer of the receiving end is non-empty, periodically obtain the data depth information of the buffer, and if the data depth increases and exceeds j×Y/k, adjust m as $(m-(2^j \times T))_{round\ down}$, wherein, j represents a segment value of current data depth, j is a positive integer and j<=k, T is an adjusted stepping rate, T>0 and $(\Sigma_{i=1}^{k} 2^i \times T) \leq (t \times m)$, t is a maximum amplitude for adjustment of an original nominal value m which is determined according to the rational number frequency division method, 0<t<1, and the value of T is adjustable; and if detecting that the buffer overflows, increase the value of T.

14. The apparatus according to claim 10, wherein, the frequency dividing ratio adjustment module is further configured to record information that the buffer with the data depth being Y is set as k segments, wherein, Y>k and both Y and k are positive integers;

when detecting that the buffer of the receiving end is changed from empty to non-empty, determine that the frequency dividing ratio is m/n, wherein, both nominal values m and n are positive integers;

when detecting that the buffer of the receiving end is non-empty, periodically obtain the data depth information of the buffer, and if the data depth increases and exceeds $j \times Y/k$, adjust m as $(m-(2^j \times T))_{round\ down}$, wherein, j represents a segment value of current data depth, j is a positive integer and j<=k, T is an adjusted stepping rate, T>0 and $(\Sigma_{i=1}^{k} 2^i \times T) \leq (t \times m)$, t is a maximum amplitude for adjustment of an original nominal value m which is determined according to the rational number frequency division method, 0<t<1, and the value of T is adjustable; and if detecting that the buffer overflows, increase the value of T.

15. The apparatus according to claim 10, wherein, the buffer maintenance module comprises a detection module, a storage module, and a data reading module, wherein, the detection module is configured to detect the data depth of the storage module in real time, and provide the data depth information to the frequency dividing ratio adjustment module;

the storage module comprises the buffer, and the storage module is configured to store the asynchronous data obtained through the start bit detection module performing de-encapsulation; and the data reading module is configured to read and output data in the storage module by using the reading clock, and if detecting that the reading clock stops, output data representing idle.

16. The apparatus according to claim 8, wherein, the apparatus further comprises an input data conversion module, an output data conversion module and a timing module, and the input data conversion module is located between the start bit detection module and the buffer maintenance module, and the output data conversion module is located at an output end of the buffer maintenance module, wherein:

the input data conversion module is configured to receive data transmitted by the start bit detection module, convert the data into parallel data, and transmit the parallel data to the buffer maintenance module;

the output data conversion module is configured to receive data transmitted by the buffer maintenance module, and convert the data into serial data for output;

the timing module is configured to receive a notification of the start bit detection module, and start a timer, and when the timer expires, notify the start bit detection module, wherein a time length of the timer is equal to a time length for serial transmission of one asynchronous data package; and the start bit detection module is configured to detect a start bit of the asynchronous data in the synchronous data frame, and when the start bit of the asynchronous data is detected, notify the timing module and stop detection, and when the timer expires, resume the detection.

* * * * *